US 12,438,484 B2

(12) United States Patent
Guo et al.

(10) Patent No.: US 12,438,484 B2
(45) Date of Patent: Oct. 7, 2025

(54) MOTOR CONTROL CIRCUIT AND MEDICAL DEVICE (71) Applicant: Siemens Shanghai Medical Equipment Ltd., Shanghai (CN)

(72) Inventors: Can Guo, Shanghai (CN); Jun Wang, Shanghai (CN)

(73) Assignee: Siemens Shanghai Medical Equipment Ltd., Shanghai (CN)

( * ) Notice: Subject to any disclaimer, the term of this patent is extended or adjusted under 35 U.S.C. 154(b) by 124 days.

(21) Appl. No.: 18/549,659

(22) PCT Filed: Sep. 8, 2021

(86) PCT No.: PCT/CN2021/117219
§ 371 (c)(1),
(2) Date: Sep. 8, 2023

(87) PCT Pub. No.: WO2022/188380
PCT Pub. Date: Sep. 15, 2022

(65) Prior Publication Data
US 2024/0297601 A1    Sep. 5, 2024

(30) Foreign Application Priority Data

Mar. 12, 2021    (CN) .................. 202110270576.X (51) Int. Cl.
*H02P 3/10*    (2006.01)
*H02P 3/08*    (2006.01)
(Continued)

(52) U.S. Cl.
CPC .................. *H02P 7/05* (2016.02); *H02P 3/08* (2013.01); *H02P 7/28* (2013.01)

(58) Field of Classification Search
CPC ...... H02P 3/10; H02P 7/05; H02P 7/28; H02P 7/03; H02P 3/08; A61B 6/0487
(Continued)

(56) References Cited

U.S. PATENT DOCUMENTS 4,785,914 A * 11/1988 Blain ................... B66B 5/02
187/280
5,757,596 A * 5/1998 Weber .................. H02H 7/0833
361/115
(Continued)

FOREIGN PATENT DOCUMENTS

| CN | 101499751 A | 8/2009 |
| CN | 201800680 U | 4/2011 |
| CN | 111987967 A | 11/2020 |
| CN | 214480353 U | 10/2021 |
| JP | H10252928 A | 9/1998 |

OTHER PUBLICATIONS

Rohm Co. Ltd.: "DC Brush Motor Drivers (18V Max) BD6222xxx Series General Description"; XP055870923; URL: https://fscdn.rohm.comen/products/databook/datasheet/ic/motor/dc/bd622x-e.pdf; 2014.
(Continued)

*Primary Examiner* — Gabriel Agared
(74) *Attorney, Agent, or Firm* — Banner & Witcoff Ltd.

(57) ABSTRACT

A motor control circuit includes a switch circuit powered by a power supply to drive a motor to output a motion. A switch drive circuit sends a valid drive signal to the switch circuit to drive the motor to output the motion. A limit switch is associated with a position of the motor's motion output, enabling the motor to generate a feedback signal when the motor outputs the motion to the position in a direction. The switch drive circuit receives the feedback signal to cut off power from the power supply to the switch circuit, and the motor stops outputting motion. The motor control circuit feeds from the limit switch back to a controller. When the direction of the motion output by the motor is switched, the (Continued)

power from the power supply to the switch circuit is turned off using the feedback signal.

11 Claims, 4 Drawing Sheets

(51) Int. Cl.
    *H02P 7/03*           (2016.01)
    *H02P 7/28*           (2016.01)

(58) Field of Classification Search
    USPC .......................................................... 318/520
    See application file for complete search history.

(56) References Cited

U.S. PATENT DOCUMENTS

| | | | |
|---|---|---|---|
| 6,013,991 A * | 1/2000 | Philipp | A61B 17/1626 |
| | | | 388/907 |
| 2018/0183361 A1* | 6/2018 | Kadoya | H02P 3/12 |
| 2018/0337618 A1* | 11/2018 | Aoki | H02P 6/17 |
| 2024/0297601 A1 | 9/2024 | Guo et al. | |

OTHER PUBLICATIONS

Dec. 23, 2021 (PCT) International Search Report and Written Opinion.

* cited by examiner

| Sf2 | Se | Sd1 |
|---|---|---|
| 0 | 0 | 0 |
| 1 | 0 | 1 |
| 0 | 1 | 1 |
| 1 | 1 | 1 |

Fig. 5a

| Sf1 | Se | Sd2 |
|---|---|---|
| 0 | 0 | 0 |
| 1 | 0 | 1 |
| 0 | 1 | 1 |
| 1 | 1 | 1 |

Fig. 5b

MOTOR CONTROL CIRCUIT AND MEDICAL DEVICE

TECHNICAL FIELD

The present invention relates to a motor in the technical field of medical instrument technologies, to a control technology for the motor, and in particular, to a control technology for a direct current motor.

BACKGROUND

A small direct current motor is widely used in medical devices. Generally, control of a direct current motor needs to meet the security and reliability of a motion, and a closed-loop control method with limits is generally adopted. When arriving at a limit switch, a main loop of the motor's power supply is cut off using a relay or a contact to stop the motion.

A controller in the direct current motor and related to motion control generally implements control using a microprocessor or a programmable logic circuit. For example, when the controller senses a motion position of the motor, a signal from the limit switch needs to be fed back to the controller. However, by a general control method, the limit switch directly cuts off the motor's power supply, and therefore, a position feedback signal cannot be provided. Considering that the motor is an inductive load, electric sparks occur when the limit switch cuts off the main power supply, weakening the circuit's reliability. In addition, the feedback signal is introduced in the programmable logic circuit; software or programs are written to control the related relay or the contactor to cut off the power supply. However, there may be a delay in control by using software or programs, weakening the real-time performance, and the electric sparks generated during switching may further affect the life of the relay or the contactor, causing EMC (electromagnetic compatibility) interference. Therefore, a method and an apparatus for closed-loop control of the motor need to be considered.

SUMMARY

In view of this, according to one aspect, the present disclosure provides a simple and reliable motor control circuit with a closed-loop controlled motor, including: a switch circuit section, including at least one switch triode and configured such that a power supply supplies power to a motor by a power supply through the conductive switch triode to drive the motor to output a motion; a switch drive circuit section, configured to control the switch triode in the switch circuit section to be turned on or off; and a limit switch section, including at least one limit switch, configured to be associated with at least one limit position of the motion outputted by the motor, so that the motor generates a feedback signal when outputting the motion to the limit position in a direction, where the feedback signal is received by the switch drive circuit section, so that the switch drive circuit section controls the switch triode correspondingly associated with the limit switch to be turned off, to enable the motor to stop outputting.

Optionally, the limit switch section of the motor control circuit includes: a first limit switch, configured to be associated with a first limit position of the motion outputted by the motor, so that the motor generates a first feedback signal when the output of the motor is rotated to the first limit position in a first direction and the first feedback signal is received by the switch drive circuit section, to enable the switch drive circuit section to control a first switch triode in the switch circuit section associated with the first limit switch to be turned off; and a second limit switch, configured to be associated with a second limit position of the motion outputted by the motor, so that the motor generates a second feedback signal when the output of the motor is rotated to the second limit position in a second direction opposite to the first direction and the second feedback signal is received by the switch drive circuit section, to enable the switch drive circuit section to control a second switch triode in the switch circuit section associated with the second limit switch to be turned off.

Optionally, the switch triode of the motor control circuit includes one of or a combination of a thyristor, a triode, a CMOS transistor, and an IGBT transistor.

Optionally, the motor control circuit further includes a direction control circuit section, configured to be coupled to the switch circuit section to be connected to the motor and configured to control the direction of the motion outputted by the motor by switching the on or off between the switch triode in the switch circuit section and the motor.

Optionally, the switch circuit section of the motor control circuit includes: a first switch triode, configured to be coupled to the direction control circuit section to be connected to a first end of the motor, and configured to receive a corresponding first drive signal from the switch drive circuit section and be turned on upon receiving of a valid first drive signal, to enable the power supply to drive the motor to output the motion in a first direction; and a second switch triode, configured to be coupled to the direction control circuit section to be connected to a second end of the motor, and configured to receive a corresponding second drive signal from the switch drive circuit section and be turned on upon receiving of a valid second drive signal, to enable the power supply to drive the motor to output the motion in a second direction, where the first drive signal received by the first switch triode or the second drive signal received by the second switch triode is associated with the direction controlling the motion outputted by the motor.

Optionally, the direction control circuit section of the motor control circuit includes: a first relay, configured to be coupled to the first end of the motor, a normally-closed contact of the first relay being configured to be grounded, and a normally-open contact being configured to be conducted to the first switch triode; and a second relay, configured to be coupled to the second end of the motor, a normally-closed contact of the second relay being configured to be conducted to the second switch triode, and a normally-open contact being configured to be grounded, where the first relay and the second relay each receive a direction control signal, and when the direction control signal is at a first level waveform, the first relay is grounded, the second relay is conducted to the corresponding second switch triode in the switch circuit section, and the motor outputs the motion in the first direction; and when the direction control signal is at a second level waveform, the second relay actuates to be grounded, the first relay actuates to be conducted to the corresponding first switch triode in the switch circuit section, and the motor outputs the motion in the second direction.

Optionally, the motor control circuit further includes a controller and an interface circuit, where the interface circuit is configured to receive the corresponding feedback signal from at least one limit switch and feed the feedback signal to the controller.

Optionally, the motor control circuit further includes a direction control circuit section, configured to be coupled to the switch circuit section to be connected to the motor and configured to receive a direction control signal from the controller to control the direction of the motion outputted by the motor, wherein the controller is further configured to select the on or off of the corresponding switch triode in the switch circuit section by using the switch drive circuit section based on properties of the direction control signal.

Optionally, the controller of the motor control circuit is further configured to determine to send an enable signal to the switch drive circuit section based on the feedback signal received from the limit switch to enable the switch drive circuit section to send a drive signal to a switch triode associated with the limit switch in the switch circuit section.

Optionally, the switch drive circuit section of the motor control circuit is configured to be correspondingly coupled to the switch triode in the switch circuit section. The controller is configured to send the enable signal to the switch drive circuit section to enable the switch drive circuit section to send a drive signal to the switch triode conducted to the motor in the switch circuit section.

Optionally, the switch drive circuit section of the motor control circuit includes a logic circuit, where the logic circuit is configured to receive an enable signal from the controller and receive at least one feedback signal from the limit switch, and when receiving a valid enable signal and an invalid feedback signal, the logic circuit outputs a valid drive signal to the switch triode associated with the limit switch, and the motor outputs the motion. When receiving a valid feedback signal, the logic circuit outputs the invalid drive signal to the switch triode, and the motor stops outputting the motion.

According to another aspect of the present disclosure, a medical device is provided, including a motor and a motor control circuit mentioned above, where the motor control circuit controls at least an outputted motion, a direction, and a limit of the motor.

An advantage of the motor control circuit provided in the present disclosure is that when the motor moves to a specific position, the switch drive circuit section receives the feedback signal triggered by the limit switch, and conduction of the corresponding switch triode in the switch circuit section is cut off by the switch drive circuit, to enable the power supply to stop supplying power to the motor, resolving problems of electromagnetic interference and sparks caused by inductive load of the motor (or a direct current motor) when the power supply is directly cut off by the limit switch, thereby improving reliability and security of the motor control circuit.

Another advantage is that when the direction of the motion outputted by the motor is switched, the corresponding switch triode in the switch circuit section is selected to be conducted by a level associated with a direction control signal without relying on a relay (pack) to control a direction of power supply output, resolving problems of electromagnetic interference and sparks caused when the direction of the power supply output is switched by using the relay (pack), thereby improving reliability and security of the motor control circuit.

Another advantage is that a technical solution for feeding the feedback signal triggered by the limit switch to the controller is provided, resolving a problem that the feedback signal generated by the limit switch cannot be fed back to the controller in the existing motor control circuit.

Another advantage is that a process of the limit switch feeding the feedback signal to the controller does not depend on the controller to generate an enable signal in an invalid state to cut off the power supply to the motor for driving the output; instead, it directly feeding the feedback signal to the switch drive circuit section and cutting off the power supply to the motor by using the switch drive circuit section, thereby resolving a delay problem caused by software control in the controller due to depending on the controller to send the enable signal to the switch drive circuit and a problem of device damage or motor burnout caused by software written in the controller being down or delayed and not being able to stop the motor upon arrival at the limit position. Therefore, based on the logic circuit receiving the feedback signal from the limit switch, the switch drive circuit generates the invalid drive signal that cuts off the conduction of the switch triode in the switch circuit section.

BRIEF DESCRIPTION OF THE DRAWINGS

To enable a person of ordinary skill in the art to understand the foregoing and other features and advantages of the present invention more clearly, embodiments according to the present disclosure are described in detail below with reference to the accompanying drawings. In the accompanying drawings.

REFERENCE NUMERALS ARE AS FOLLOWS 100 motor control circuit
102 direction control circuit section
104 switch circuit section
106 switch drive circuit section
1062a first OR gate
1062b second OR gate
108 limit switch section
1081. first limit switch
1082 second limit switch
110 controller
112 interface circuit
200 motor
Sd drive signal
$Sd_1$ first drive signal
$Sd_2$ second drive signal
$S_{dir}$ direction control signal
Se enable signal
$Sf_1$ first feedback signal
$Sf_2$ second feedback signal
D1, D2 diode
Q1 first switch triode Q2 second switch triode
K1 first relay
K2 second relay

DETAILED DESCRIPTION

To have a clearer understanding of the technical features, the objectives, and the effects of the present invention, specific implementations of the present invention are now illustrated with reference to the accompanying drawings, and the same reference numerals in the accompanying drawings represent the same parts.

In this specification, "schematic" indicates "serving as an example, a case, or description," and any illustration or implementation described as "schematic" in this specification should not be interpreted as a more preferred or more advantageous technical solution.

For brevity of the accompanying drawings, only parts related to the present invention are schematically shown in the accompanying drawings and do not represent an actual structure as a product. In addition, for the brevity of the accompanying drawings and ease of understanding, for components with the same structures or functions in some accompanying drawings, only one of the components is schematically shown or marked.

In this specification, "one" not only indicates "only one" but also indicates "more than one." In this specification, "first," "second," and the like are only used to distinguish from each other, not to indicate importance, an order, and a premise of mutual existence thereof, and the like.

Generally, a motor control circuit may include a controller, an on-off control circuit, and a direction control circuit configured to control a rotation direction of a motor. In some technical solutions, for example, the on-off control circuit generally consists of one or two relays or contactors to cut off the power supply. However, the motor is an inductive load, and in a process of cutting off the power supply and/or switching an output direction of the power supply by using a limit switch or the relay, electric sparks and electromagnetic interference are caused. In addition, electric sparks and electromagnetic interference may also be caused when switching a direction of a motion outputted by the motor by using the relay. In other technical solutions, the motor triggers a limit switch action upon arrival at a limit position but cannot feed a feedback signal generated by the limit switch to the controller. In some other technical solutions, controlling the motor's rotation direction and feeding the feedback signal from the limit switch to the controller are implemented by using a plurality of sets of relays. However, installation errors may be introduced in this way, causing inconsistent feedback signals. In some other technical solutions, the controller is configured to receive the feedback signal from the limit switch and generate a drive signal in an invalid state for controlling the motor to stop, depending on the reliability of the software written in the controller if the controller is down or delayed, a problem that the motor does not stop when upon arrival at the limit position may be caused.

A motor control circuit is provided in the present disclosure, based on the limit switch; the feedback signal is fed to the controller and a switch drive circuit section. The switch drive circuit section sends an invalid drive signal to a corresponding switch triode in a switch circuit section after receiving the feedback signal from the limit switch to cut off the conduction, thereby enabling the motor to stop outputting. In this case, the switching an output direction of the power supply and the cutting off the output of the power supply do not depend on the switching and the cutting off of the output direction of the power supply by the relay, for example, so that security problems of electric sparks and electromagnetic interference are resolved. In addition, cutting off the driving to the motor by using the feedback signal from the limit switch does not depend on an enable signal generated by the controller, thereby bypassing the security problems caused by the delay and the shutdown of controller software.

A motor control circuit provided in the present disclosure is described in detail below with reference to the accompanying drawings.

Figure 1:
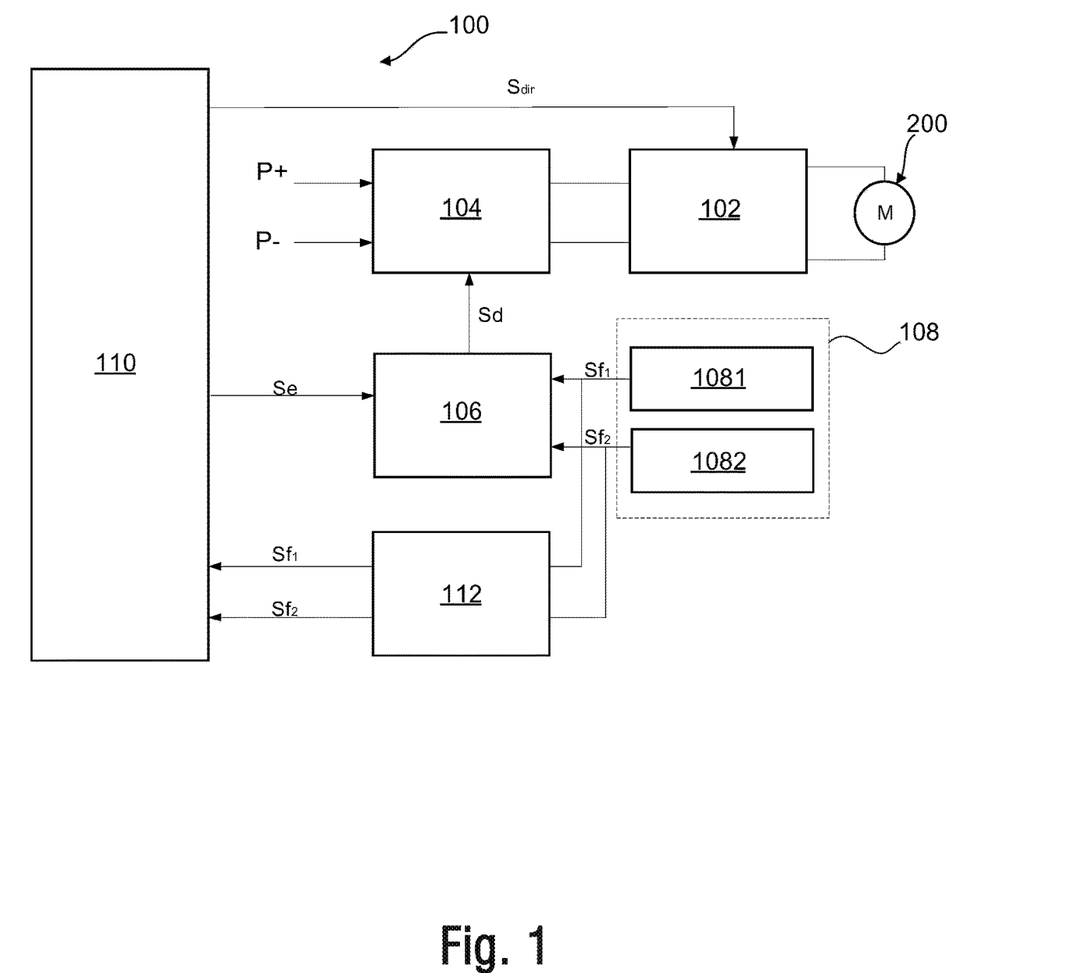
FIG. 1 is a schematic structural diagram of a function of a motor control circuit according to an exemplary embodiment.

FIG. 1 is a schematic structural diagram of a function of a motor control circuit according to an exemplary embodiment.

Figure 2:
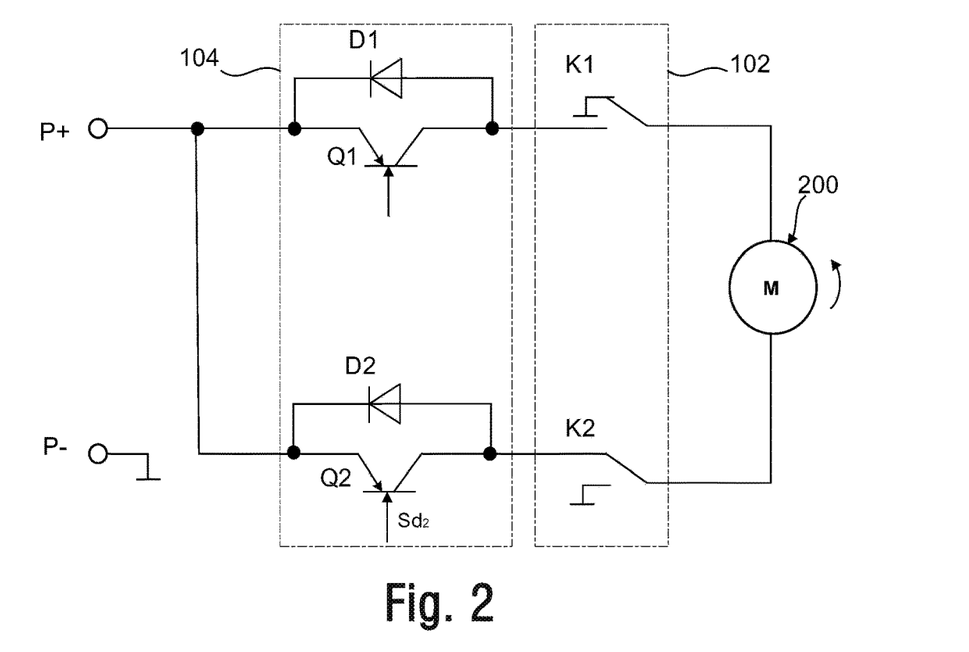
FIG. 2 is a schematic structural diagram of a circuit of controlling a motor to output a motion in a first direction in a motor control circuit according to an exemplary embodiment.
Figure 3:
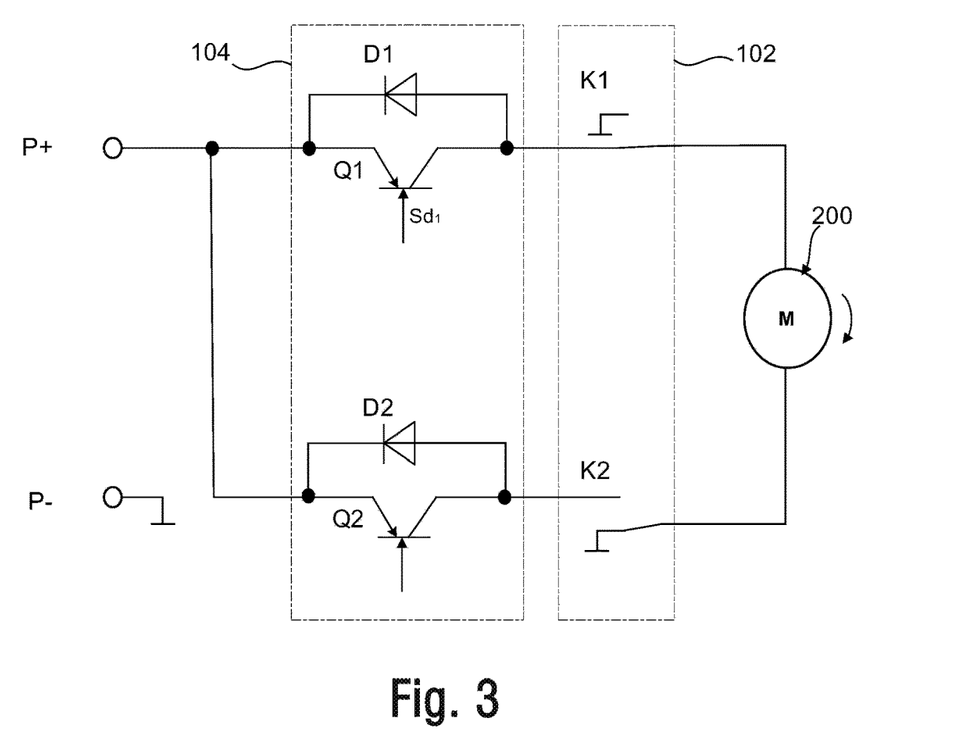
FIG. 3 is a schematic structural diagram of a circuit controlling a motor to output a motion in a second direction in a motor control circuit according to an exemplary embodiment.

As shown in FIG. 1, a motor control circuit 100, according to a provided embodiment, includes a switch circuit section 104, including at least one switch triode and configured such that a power supply supplies power to a motor 200 through the conductive switch triode, to drive the motor 200 to output a motion; a switch drive circuit section 106, configured to control the switch triode in the switch circuit section 104 to be turned on or off. For example, the switch drive circuit section 106 may send a drive signal to the switch triode and enable the corresponding switch triode to be conducted to drive the motor 200 to output the motion under the effect of a valid drive signal. A limit switch section 108, including at least one limit switch, is configured to be associated with at least one limit position of the motion outputted by the motor 200 so that the motor 200 generates a feedback signal when outputting the motion to the limit position in a direction, where the feedback signal is received by the switch drive circuit section 106 so that the switch drive circuit section 106 controls the switch triode associated with the limit switch to be turned off, to enable the motor 200 to stop outputting. It is easily understood that the direction of the motion outputted by the motor 200 may be selected to conduct the switch triode associated with the direction. For example, given that the motor 200 outputs the motion in a first direction, the limit switch associated with the direction can be easily determined. The association relationship can be set by using a program to select the on or off of the corresponding switch triode. In addition, the switch triode is generally a semiconductor switch triode, such as a thyristor, a triode, a CMOS transistor, and an IGBT transistor. It is not limited to be formed by an NPN junction or a PNP junction. As shown in FIG. 2 and FIG. 3, in this case, taking the triode as an example, diodes D1 and D2, such as freewheeling diodes, can be connected in parallel between a source and an emitter of the switch triode to protect the switch triode from being broken down. In addition, the motor 200 may be a direct current motor.

According to a provided embodiment, limit positions are set when the motor control circuit 100 is configured to control the motor 200 to output a motion or rotate in a forward direction and a reverse direction. A corresponding feedback signal is fed back so that the motor 200 stops outputting when the motion outputted by the motor 200 arrives at the foregoing two limit positions. As shown in FIG. 2 and FIG. 3, the limit switch section 108 includes: a first limit switch 1081, configured to be associated with a first limit position of the motion outputted by the motor 200, so that when the motor 200 outputs the rotation to the first limit position in the first direction such as a counterclockwise direction, a first feedback signal $Sf_1$ is generated and received by the switch drive circuit section 106, to enable the switch drive circuit section 106 to control a second switch triode Q2 associated with the first limit switch 1081 in the switch circuit section 104 to be turned off, for example, the second switch triode Q2 connected to a second end (or referred to as a negative terminal, or a lower end) of the motor 200 is configured to be turned off, so that the motor 200 stops outputting the motion in such as the counterclockwise direction due to having no way to obtain the power supply, and when the motion outputted by the motor 200 in the counterclockwise direction does not arrive at the first limit position to trigger the first limit switch 1081 to generate the first feedback signal $Sf_1$ fed back to the switch drive circuit section 106, the second switch triode Q2 associated with the first limit switch 1081 is turned on; and a second limit switch 1082, configured to be associated with a second limit position of the motion outputted by the motor 200, so that when the motor 200 outputs the rotation to the second limit position in a second direction such as a clockwise direction, a second feedback signal $Sf_2$ is generated by the second limit switch 1082 and received by the switch drive circuit section 106, to enable the switch drive circuit section 106 to control a first switch triode Q1 correspondingly associated with the second limit switch 1082 in the switch circuit section 104 to be turned off, for example, the first switch triode Q1 connected to the first end (or referred to as a positive terminal, or an upper end) of the motor 200 is configured to be in the off state, so that the motor 200 stops outputting in the clockwise direction. Similarly, when the motion outputted by the motor 200 in the clockwise direction does not arrive at the second limit position to trigger the second limit switch to generate the second feedback signal $Sf_2$ fed back to the switch drive circuit section 106, the first switch triode Q1 associated with the second limit switch 1082 is turned on. In this case, the motion outputted by the motor 200 is limited between the first limit position and the second limit position to control the output of the motor 200 reliably.

The motor control circuit 100, according to a provided embodiment, further includes a controller 110 and an interface circuit 112, where the interface circuit 112 is configured to receive the corresponding feedback signal from at least one limit switch, for example, the first feedback signal $Sf_1$ and the second feedback signal $Sf_2$ are respectively received from the first limit switch 1081. The second limit switch 1082 corresponds to the motion outputted by the motor 200 to the first and second limit positions, and the foregoing feedback signals are fed to the controller 110. In this case, the feedback signal generated by the specific limit switch is fed back to the controller 110 to enable the controller 110 to determine the direction and arrival position of the motion outputted by the motor 200 so that the controller 110 can control the on or off of the associated switch triode according to the direction and the arrival position. The advantage may be described with reference to the exemplary embodiment below.

Specifically, according to the motor control circuit 100 in a provided embodiment, the controller 110 is further configured to determine to send an enable signal Se to the switch drive circuit section 106 based on the feedback signal that is generated by and received from the limit switch, to enable the switch drive circuit section 106 to select the switch triode associated with the limit switch in the switch circuit section 104 to send a drive signal Sd. In this case, for example, at least two limit switches are configured to be associated with the limits of the motion outputted by the motor 200 in the forward and reverse directions, and based on the feeding of the feedback signal generated by one of the limit switches, the controller 110 may further enable the switch drive circuit section 106 to select the switch triode in the switch circuit section 104 and associated with the limit switch to send an invalid drive signal Sd, to control the switch triode to be turned off. Therefore, security control of the motion outputted by the motor 200 by the motor control circuit 100 can be achieved.

As shown in FIG. 1, according to the motor control circuit 100 in a provided embodiment, the motor control circuit further includes a direction control circuit section 102, configured to be coupled to the switch circuit section 104 to be connected to the motor 200, and configured to control the direction of the motion outputted by the motor 200 by switching the on or off between the switch triode in the switch circuit section 104 and the motor 200.

According to the motor control circuit 100 in a provided embodiment, the direction control circuit section 102 is configured to receive a direction control signal $S_{dir}$ from the controller 110 to control the direction of the motion outputted by the motor 200, where the controller 110 is further configured to select the on or off of the corresponding switch triode in the switch circuit section 104 based on properties of the direction control signal $S_{dir}$. It is easily understood that, for example, by programming the controller 110, the direction of the motion outputted by the motor 200 is determined under the effect of the direction control signal $S_{dir}$ so that the limit switch associated with the direction is determined to select the on or off of the switch triode associated with the limit switch by using the controller 110. In this case, the property of the direction control signal $S_{dir}$ includes a level form thereof, such as whether the form is out of a high level or a low level and how the direction control signal $S_{dir}$ is associated with the limit switch and the switch triode is described below by using examples.

According to the motor control circuit 100 in a provided embodiment, the switch circuit section 104 is configured to receive the enable signal Se from the controller 110 to enable the switch drive circuit section 106 to send the drive signal Sd to the switch circuit section. In addition, the enable signal Se may also be selected to turn on one of the corresponding switch triodes; for example, after the related direction of the direction control signal $S_{dir}$ is determined by using the program written by the controller 110, the enable signal Se may select to turn on the switch triode associated with the direction, so that the drive signal Sd can be sent to the target switch triode according to the enable signal Se. In this case, the drive signal Sd may be generated according to the enable signal Se. It may be in the valid or invalid state by using software timing or program timing written for the controller 110.

FIG. 2 is a schematic structural diagram of a circuit controlling a motor to output a motion in a first direction in a motor control circuit according to an exemplary embodiment.

According to the motor control circuit 100 in a provided embodiment, to achieve the switching the direction of the output rotation of the motor 200 by the switch circuit section 104, as shown in FIG. 3, the switch circuit section 104 includes: a first switch triode Q1, configured to be connected to the positive terminal or the upper end of the motor 200 by using the direction control circuit section 102, for example, a first relay K1 is coupled to a first end of the motor 200, and the first switch triode Q1 is alternatively configured to receive a corresponding first drive signal $Sd_1$ from the switch drive circuit section 106 and be turned on upon receiving of a valid first drive signal $Sd_1$, to enable the power supply to drive the motor 200 to output the motion (that is, the motor 200 outputs the motion in the clockwise direction)

by using the turned-on first switch triode Q1; and a second switch triode Q2, configured to be connected to the negative terminal or the lower end of the motor 200 by using the direction control circuit section 102, for example, a second relay K2 is coupled to a second end of the motor 200, as shown in FIG. 2, and the second switch triode Q2 is alternatively configured to receive a corresponding second drive signal $Sd_2$ from the switch drive circuit section 106 and be turned on upon receiving of a valid second drive signal $Sd_2$, to enable the power supply to drive the motor 200 to output the motion (that is, the motor 200 outputs the motion in the counterclockwise direction) by using the turned-on second switch triode Q2. Considering that the first drive signal $Sd_1$ received by the first switch triode Q1 or the second drive signal $Sd_2$ received by the second switch triode Q2 is associated with the direction of the motion outputted by the motor, such as a level property of the associated direction control signal $S_{dir}$, actions associated with the first relay K1 and the second relay K2 when the foregoing drive signals Sd are selected to be sent to the first switch triode Q1 and the second switch triode Q2 can be achieved by writing timing sequences of the enable signal Se for the controller 110 and determining the switch drive circuit section 106 for correspondingly receiving the enable signal and sending the enable signal to the corresponding switch triode. Implementing the foregoing functions will be described below using the embodiments.

Specifically, to achieve that the first drive signal $Sd_1$ received by the first switch triode Q1 and the second drive signal $Sd_2$ received by the second switch triode Q2 are associated with the direction of the motion outputted by the motor or equivalent to the level property of the associated direction control signal $S_{dir}$, as shown in FIG. 2 and FIG. 3, according to the motor control circuit 100 in a provided embodiment, the direction control circuit section 102 includes: a first relay K1, configured to be connected to the first end (or the upper end) of the motor 200, a normally-closed contact of the first relay K1 being grounded, and a normally-open contact thereof being configured to be conducted to the first switch triode Q1; and a second relay K2, configured to be connected to the second end (or the lower end) of the motor 200, a normally-closed contact of the second relay K2 being configured to be conducted to the second switch triode Q2, and a normally-open contact thereof being grounded, where the first relay K1 and the second relay K2 each receive the direction control signal $S_{dir}$ from the controller 110, so that when the direction control signal $S_{dir}$ is at a first level waveform, for example, the first level waveform is in a low level, the first relay K1 and the second relay K2 are not pulled-in, that is, the first relay K1 in an initial state is grounded, and the normally-closed contact of the second relay K2 is in contact with the second switch triode Q2, that is, the second relay K2 in an initial state is conducted to the corresponding second switch triode Q2 in the switch circuit section 104, and in this case, the motor 200 outputs the motion in the first direction such as the counterclockwise direction; and when the direction control signal is at a second level waveform, for example, the second level waveform is in a high level, the first relay K1 and the second relay K2 are pulled-in, that is, the second relay K2 actuates to the grounding in a normally-closed contact state that is conducted to the second switch triode Q2, the first relay K1 actuates to be conducted to the corresponding first switch triode Q1 in the switch circuit section 104 in the normally-closed contact state that is grounded, and the motor 200 outputs the motion in the second direction opposite to the first direction such as the clockwise direction. In addition, the controller 110 may be configured to determine the direction of the motion outputted by the motor 200 by determining whether the direction control signal $S_{dir}$ is out of the high or the low level and controlling the switch triode associated with the direction.

According to the motor control circuit 100 in a provided embodiment, the switch drive circuit section 106 is configured to be correspondingly coupled to the switch triode in the switch circuit section 104. The controller 110 is configured to send the enable signal Se to the switch drive circuit section 106 to enable the switch drive circuit section 106 to send the drive signal Sd to the switch triode conducted to the motor 200 in the switch circuit section 104. For example, the switch drive circuit section 106 includes a plurality of output terminals to be coupled to the switch triode by connecting in a one-to-one correspondence to enable the switch drive circuit section 106 to send the drive signal Sd only to the switch triode conducted to the motor 200 after receiving the enable signal Se at an input side, so that the off or on of the switch triode is controlled, thereby controlling the motion outputted by the motor 200.

According to the motor control circuit 100 in a provided embodiment, to achieve that, the switch drive circuit section 106 sends the invalid drive signal Sd to the corresponding switch triode to turn off the switch triode after receiving the feedback signal fed back by at least one limit switch, the motor 200 stops outputting the motion. The switch drive circuit section 106 includes a logic circuit; the logic circuit is configured to receive the enable signal Se from the controller 110 and receive at least one feedback signal, such as the first feedback signal $Sf_1$ from the first limit switch 1081 and/or the second feedback signal $Sf_2$ from the second limit switch 1082, and the logic circuit inputs the valid drive signal Sd to the switch triode associated with the limit switch when receiving the valid enable signal and the invalid feedback signal, to enable the motor 200 to maintain the outputted motion in the direction; the logic circuit inputs the invalid drive signal Sd to the switch triode when receiving the invalid enable signal, to enable the motor 200 to stop outputting. The logic circuit inputs the invalid drive signal Sd to the switch triode when receiving the valid feedback signal, enabling the motor 200 to stop outputting.

Figure 4:
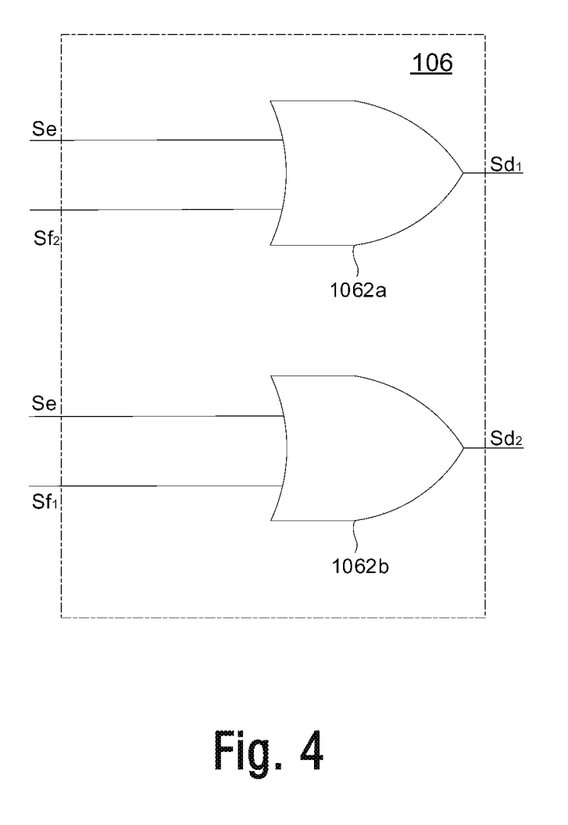
FIG. 4 is a schematic circuit diagram of a logic circuit in a switch drive circuit section according to an exemplary embodiment.

In a provided embodiment, as shown in FIG. 4, based on a logic circuit, it can be achieved that the switch drive circuit section 106 receives the enable signal Se at the input side and sends the drive signal Sd to the switch triode conducted to the motor 200 at an output side, to control the off or on of the switch triode and control the motion outputted by the motor 200 based on the feedback signal from the limit switch. For example, the logic circuit may be configured to include a first OR gate 1062a and a second OR gate 1062b, where the first OR gate 1062a is configured to receive the second feedback signal $Sf_2$ from the second limit switch 1082. The enable signal Se from the controller 110 and is configured to output the first drive signal Sd1 to the first switch triode Q1, to control the motor 200 to output the motion in the clockwise direction. The second OR gate 1062b is configured to receive the first feedback signal Sf1 from the first limit switch 1081 and receive the enable signal Se from the controller 110. It is configured to output the second drive signal $Sd_2$ to the second switch triode Q2, to control the motor 200 to output the motion in the counterclockwise direction. It should be noted that the foregoing logic circuit is respectively configured to receive the second feedback signal $Sf_2$ and the enable signal Se, and receive the first feedback signal $Sf_1$ and the enable signal Se by using the relatively independent first OR gate 1062a and the second OR gate 1062b, so that the writing of a control program based on the controller 110 can be conveniently implemented, to switch the conduction of the switch triode (or the property of the direction control signal $S_{dir}$ from the direction control circuit section 102) in the switch circuit section 104 to the motor 200, thereby enabling the controller 110 to select to send the enable signal Se (not limited to the valid or the invalid enable signal Se) to the first OR gate 1062a or the second OR gate 1062b, and for example, according to the first feedback signal $Sf_1$ or the second feedback signal $Sf_2$ fed back by the first limit switch 1081 or the second limit switch 1082, the controller 110 may further determine to send the invalid enable signal Se to the first OR gate 1062a or the second OR gate 1062b. In addition, the logic circuit may be further extended to the processing of logic relationships between the direction control signal $S_{dir}$, the first drive signal $Sd_1$, and the second drive signal $Sd_2$, or may be implemented according to further program writing of the controller 110, and details are not described herein.

Figure 5A:
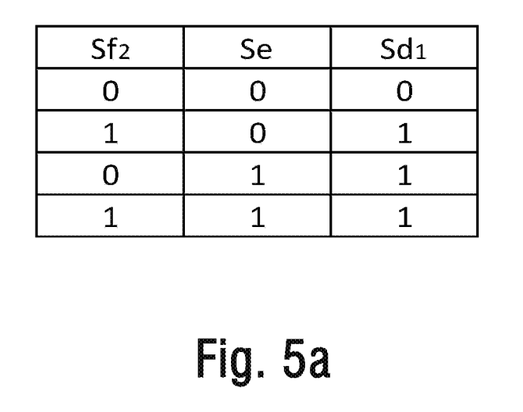
FIG. 5a and FIG. 5b are schematic diagrams of logic tables based on a feedback signal, an enable signal, and a drive signal from a logic circuit according to an exemplary embodiment.
Figure 5B:
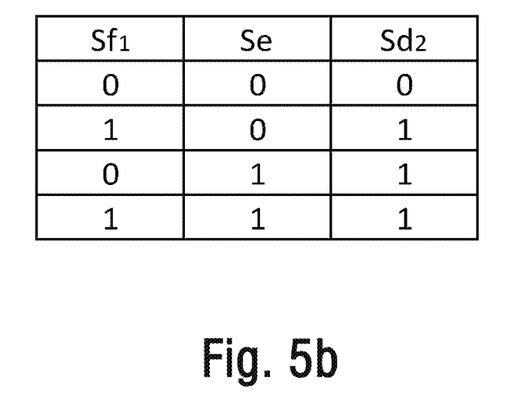

FIG. 5a and FIG. 5b are schematic diagrams of logic tables based on a feedback signal, an enable signal, and a drive signal from a logic circuit according to an exemplary embodiment.

As shown in FIG. 5a, based on the control of the shown logic circuit for the first switch triode Q1, for example, when the second feedback signal $Sf_2$ is at the low level (taking the value of 0), the motion outputted by the motor 200 in the clockwise direction does not arrive at the second limit switch 1082. When the enable signal Se is at a valid low level (taking the value of 0), the first OR gate 1062a outputs the first drive signal $Sd_1$ at the low level (being valid when taking the value of 0) to the first switch triode Q1, the first switch triode Q1 is turned on, and the motor 200 continues to output the motion in the clockwise direction. When the motion outputted by motor 200 in the clockwise direction arrives at the second limit switch 1082, the second limit switch 1082 is triggered, the second feedback signal $Sf_2$ is converted into the high level (taking the value of 1), the first OR gate 1062a outputs the first drive signal $Sd_1$ at the high level (being invalid when taking the value of 1) to the first switch triode Q1, the first switch triode Q1 is turned off, and the motor 200 stops outputting. In addition, FIG. 5b similarly shows, for example, the control of the second OR gate 1062b for the second switch triode Q2, that is, controlling the on or off of the second switch triode Q2 by using the second OR gate 1062b, to control the motor 200 to output the motion in the counterclockwise direction and feed the first feedback signal $Sf_1$ at the high level to the second OR gate 1062b when the motor 200 moves to the first limit switch 1081, so that the second OR gate 1062b sends the second drive signal $Sd_2$ at the high level to the second switch triode Q2, the second switch triode Q2 is turned off, and the motor 200 stops outputting in the counterclockwise direction. Therefore, a safe, precise, and punctual effect can be achieved on the foregoing control of the motor control circuit 100 for the motor 200.

The controller 110 may include a general microprocessor and a dedicated microprocessor. The controller 110 may include, for example, but is not limited to one or more central processing units (CPUs), one or more application-specific integrated circuits (ASICs), and/or one or more field-programmable gate arrays (FPGAs), and the like.

According to another aspect of the present disclosure, a medical device is provided, including a motor 200 and a motor control circuit 100 mentioned above, where the motor control circuit 100 controls at least an outputted motion, a direction, and a limit of the motor. A medical device may be a medical device component such as a bed plate of a scanning bed or a detector in an x-ray inspection device driven by the motor 200. The outputted motion or rotation of the motor 200 controls a motion of the bed plate of the scanning bed or the detector through transmission construction, and the motor control circuit 100 may control the outputted motion, the direction, and the limit of the motor to control security operations of the related medical component.

It should be understood that although this specification is described according to each embodiment, each embodiment may not include only one independent technical solution. The description manner of this specification is merely for clarity. This specification should be considered as a whole by a person skilled in the art, and the technical solution in each embodiment may also be properly combined to form other implementations that can be understood by the person skilled in the art.

The foregoing descriptions are merely embodiments of the present invention but are not intended to limit the present invention. Any modification, equivalent replacement, or improvement made within the spirit and principle of the present invention shall fall within the protection scope of the present invention.

What is claimed is:

1. A motor control circuit, comprising:
   a switch circuit section comprising at least one switch triode and configured such that a power supply supplies power to a motor through the at least one switch triode to drive the motor to output a motion;
   a switch drive circuit section configured to control the switch triode in the switch circuit section to be turned on or off; and
   a limit switch section comprising:
      at least one limit switch configured to be associated with at least one limit position of the motion output by the motor so that the motor generates a feedback signal when outputting the motion to the limit position in a direction, wherein the feedback signal is received by the switch drive circuit section so that the switch drive circuit section controls the switch triode correspondingly associated with the limit switch to be turned off, to enable the motor to stop the motion output; and
   a direction control circuit section coupled between the switch circuit section and the motor, and configured to control the direction of the motion output by the motor by switching on or off between the switch triode in the switch circuit section and the motor.

2. The motor control circuit according to claim 1, wherein the limit switch section comprises:
   a first limit switch configured to be associated with a first limit position of the motion output by the motor so that the motor generates a first feedback signal when the output of the motor is rotated to the first limit position in a first direction and the first feedback signal is received by the switch drive circuit section to enable the switch drive circuit section to control the switch triode in the switch circuit section associated with the first limit switch to be turned off; and
   a second limit switch configured to be associated with a second limit position of the motion output by the motor so that the motor generates a second feedback signal when the output of the motor is rotated to the second limit position in a second direction and the second feedback signal is received by the switch drive circuit section to enable the switch drive circuit section to control the switch triode in the switch circuit section associated with the second limit switch to be turned off.

3. The motor control circuit according to claim 1, wherein the switch triode comprises a thyristor, a triode, a CMOS transistor, or an IGBT transistor.

4. The motor control circuit according to claim 1, wherein the switch circuit section comprises:
    a first switch triode configured to be coupled to the direction control circuit section to be connected to a first end of the motor, and configured to receive a corresponding first drive signal from the switch drive circuit section and be conducted upon receiving a valid first drive signal to enable the power supply to drive the motor to output the motion in a first direction; and
    a second switch triode configured to be coupled to the direction control circuit section to be connected to a second end of the motor and configured to receive a corresponding second drive signal from the switch drive circuit section and be conducted upon receiving a valid second drive signal to enable the power supply to drive the motor to output the motion in a second direction.

5. The motor control circuit according to claim 4, wherein the direction control circuit section comprises:
    a first relay configured to be coupled to the first end of the motor, a normally closed contact of the first relay being configured to be grounded, and a normally open contact being configured to be conducted to the first switch triode; and
    a second relay configured to be coupled to the second end of the motor, a normally closed contact of the second relay configured to be conducted to the second switch triode, and a normally open contact configured to be grounded,
    wherein the first relay and the second relay each receive a direction control signal, and when the direction control signal is at a first level waveform, the first relay is grounded, the second relay is conducted to the corresponding second switch triode in the switch circuit section, and the motor outputs the motion in the first direction; and
    when the direction control signal is at a second level waveform, the second relay actuates to be grounded, the first relay actuates to be conducted to the corresponding first switch triode in the switch circuit section, and the motor outputs the motion in the second direction.

6. The motor control circuit according to claim 1, further comprising:
    a controller; and
    an interface circuit,
    wherein the interface circuit is configured to receive the corresponding feedback signal from the at least one limit switch and feed the feedback signal to the controller.

7. The motor control circuit according to claim 6, wherein;
    the direction control circuit section is configured to receive a direction control signal from the controller to control the direction of the motion output by the motor, and
    to select on or off of the corresponding switch triode in the switch circuit section by using the switch drive circuit section based on properties of the direction control signal.

8. The motor control circuit according to claim 6, wherein the controller is further configured to determine to send an enable signal to the switch drive circuit section based on the feedback signal received from the limit switch, to enable the switch drive circuit section to send a drive signal to a switch triode associated with the limit switch in the switch circuit section.

9. The motor control circuit according to claim 6, wherein the switch drive circuit section is configured to be correspondingly coupled to the switch triode in the switch circuit section, and the controller is configured to send an enable signal to the switch drive circuit section to enable the switch drive circuit section to send a drive signal to the switch triode conducted to the motor in the switch circuit section.

10. The motor control circuit according to claim 6, wherein the switch drive circuit section comprises:
    a logic circuit configured to receive an enable signal from the controller and receive at least one feedback signal from the limit switch, and
    when receiving a valid enable signal and an invalid feedback signal, the logic circuit outputs a valid drive signal to the switch triode associated with the limit switch, and the motor outputs the motion, and
    when receiving a valid feedback signal, the logic circuit outputs an invalid drive signal to the switch triode, and the motor stops outputting the motion.

11. A medical device, comprising:
    the motor; and
    the motor control circuit according to claim 1,
    wherein the motor control circuit is configured to control at least an output motion, a direction, and a limit of the motor.

* * * * *